United States Patent [19]

Lundin

[11] 4,041,608

[45] Aug. 16, 1977

[54] CONNECTING LEAD SUPPORTS

[75] Inventor: Sven Vilhelm Emanuel Lundin, Wurzburg, Germany

[73] Assignee: Avenska Utvecklingsaktiebolaget (SU), Stockholm, Sweden

[21] Appl. No.: 532,490

[22] Filed: Dec. 13, 1974

[51] Int. Cl.[2] .............................................. A61C 19/02

[52] U.S. Cl. ......................................................... 32/22

[58] Field of Search ......................... 32/22, 26, 27, 23; 248/160, 206, 54 R, 60, 80; 138/118, 138

[56] References Cited

U.S. PATENT DOCUMENTS

| | | | |
|---|---|---|---|
| 1,541,752 | 6/1925 | Sampson | 248/160 |
| 2,544,119 | 3/1951 | Wolfe | 138/138 |
| 2,619,125 | 11/1952 | Eickmeyer et al. | 138/118 X |
| 3,210,846 | 10/1965 | Balkin | 32/22 |
| 3,242,311 | 3/1966 | Rutherford | 248/160 X |
| 3,518,764 | 7/1970 | Lundin | 32/22 |
| 3,726,012 | 4/1973 | Grayson et al. | 32/22 |
| 3,742,606 | 7/1973 | Fleer et al. | 32/22 |

*Primary Examiner*—Robert Peshock
*Attorney, Agent, or Firm*—Fitzpatrick, Cella, Harper & Scinto

[57] ABSTRACT

The present specification discloses and claims a support for a connecting lead. The support comprises a flexible band which runs alongside and parallel to the lead, the band being connected to the lead along the entire length of the band. The band is arcuately shaped in a transverse sense which produces a longitudinal stiffening while still remaining pliable. The support has a particular application for supporting a connecting lead between a dental instrument, such as a tooth drill or air spray, and a drive unit housing for the instrument.

9 Claims, 3 Drawing Figures

CONNECTING LEAD SUPPORTS

The present invention relates to a support for a connecting lead.

More particularly the present invention relates to a support for a connecting lead, such as may issue from a housing, for a medical instrument such as a dental drill, air or water spray or the like. The lead may be in the form of a cable pipe, tube or shaft, or indeed any connection designed to supply a drive to a medical or dental instrument. Known supports of this type, which prevent leads from sagging between the instrument and the respective drive or pump, and reduce or even eliminate the tension exerted on the instrument from the lead while said instrument is being used during treatment of a patient, usually consist of rod-shaped, resiliently flexible, or resiliently and pivotably disposed supports, which engage the leads at a specific point between the drive device or pump and the instrument, and afford support thereto. However, in these known supports it is possible for the lead to sag to some extent on both sides of its single intermediate point of support, thereby hindering the use of the instrument, and also exerting undesirable tension on the instrument while it is being manipulated.

According to the present invention there is provided a support for a connecting lead, said support comprising a flexible band, which runs alongside and parallel to the lead, the band being connected to the lead along the entire length of the band which is afforded a longitudinal stiffening, whilst remaining pliable, by being arcuately shaped in a transverse sense.

The band is advantageously a thin elongate length of suitable material, e.g. steel. The band, which is transversely curved as with a roll tape measure, imparts to the lead a stiffness which prevents any sagging along the entire length of the band, and enables the lead, together with the band, to bend vertically and also at an angle to the plane surface of the band (parallel to the direction of the crown of the band curvature), so that the instrument can be moved as desired to the reception surface or to the operating position for treatment of the patient. Thus the lead, stiffened and supported by the supporting band may, for example, emerge from the drive or pump unit, or from the housing containing this unit in a direction facing away from the operating position and readiness position of the instrument, and may be bent round at a distance from the housing to the position of operation or readiness, and from there again lead in a supported and extended position to the instrument. If the instrument is moved to and fro approximately longitudinally to the end of the lead connected to the instrument, the point where the lead and supporting band bend together will correspondingly shift to and fro in approximately the same direction. Meanwhile, the parts of the lead and the band which are on either side of the bending point continue to remain extended. Furthermore, the resilient restoring force of the supporting band, which endeavours to return the band to a fully extended position from its bent position, at least partially compensates for the weight of the lead from the bending point to the instrument and also for the weight of the actual instrument, so that handling of the instrument is practically weightless.

In order to ensure that the lead is in an extended position right from the drive or pump unit or the housing containing said unit, the first part of the support band is advantageously rigidly secured to this unit or the appropriate housing in such a manner that the band is unable to pivot. A connection, as continuous as possible, of the band to the lead is ensured along the entire length of the band by the band and the lead being housed in a common hose-like casing. However, it is also possible for the supporting band to be incorporated into the casing or into the actual lead, or to form a part thereof.

The present invention will now be further described by way of example, with reference to the accompanying drawings in which.

Figure 1:
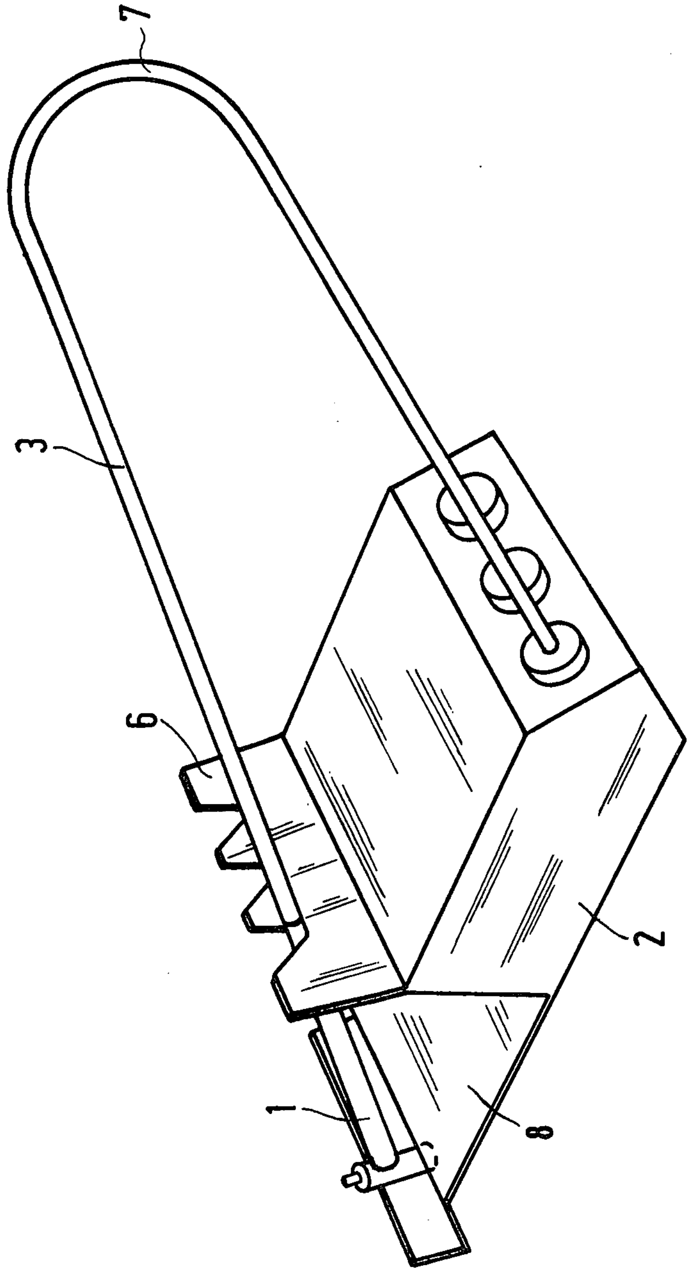
FIG. 1 shows a perspective view of one embodiment of the present invention, with an instrument in a position of readiness.

In the embodiment shown in FIG. 1, a dental instrument 1 is connected by a lead 3 (see FIG. 3) to a housing 2 which contains pumps or drive units for the dental instrument 1. The lead 3 comprises a hose, which may, for example, carry compressed air or water to the drive of the dental instrument, or for an air or water spray. Alternatively the lead 3 can be in the form of a drive shaft for a drill. From the point where the lead 3 issues from the housing 2 a transversely curved band 4 made of a basically non-resilient material, such as steel, extends alongside and parallel to the lead and is connected to the lead by means of a sleeve 5, which envelopes the band and the lead such that they abut against one another. The curved band 4, which is arcuately shaped in a transverse sense, acts as a support for the lead 3.

The point where the lead issues from and is secured to the housing 2 is on the opposite side of the housing reception surfaces 6 and 8 for the position of readiness of the instrument 1. The lead 3 and the band 4, which endeavours to assume an extended position as a result of its transverse curvature and thereby stiffens the lead, can together pass obliquely upwards, curve round at bend 7 and reach the instrument 1 without sagging, regardless of whether the instrument is in the position of readiness, shown in FIG. 1, and represented by broken lines in FIG. 2, or in the operational position shown in FIG. 2 with full lines.

Figure 3:
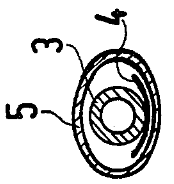
FIG. 3 shows an enlarged representation of a cross-section through the lead.

In spite of the transverse curvature of the supporting band 4, the band and lead 3 can form the described and desirable bend 7, the transverse curvature of the band being totally or substantially eliminated in the region where the band bends round. However, in the regions either side of this bend 7 the supporting band 4 retains its transverse curvature as shown in FIG. 3, which stiffens the band such that it remains in an extended position and also keeps the lead, which is connected to said band, in an extended position without the lead drooping down.

The supporting band 4 extends along the entire length of the lead from its point of issue from the housing 2 to the instrument 1. Alternatively, the band 4 extends at least past the bend 7. Care must be taken that bend 7 can shift to and fro in the longitudinal direction of the band, as can be seen from FIG. 2, when the instrument is moved to and fro in a longitudinal direction during use.

The restoring force of the bent supporting band 4 is greater when the transversely curved band is disposed such that its convex side faces the centre of curvature of the bend 7. In this case the weight of the instrument and of the adjoining portion of the lead are compensated for to a particularly high degree by the resilient restoring force of the band, thus enabling practically weightless handling of the instrument by a dentist.

Figure 2:
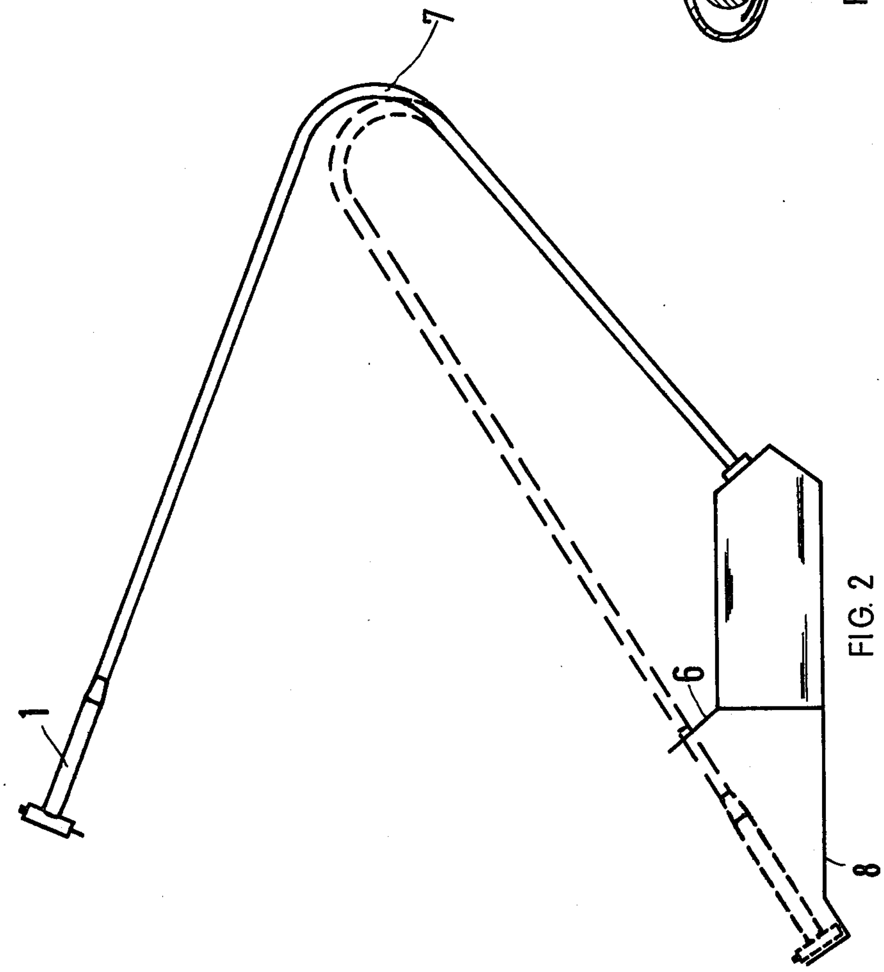
FIG. 2 shows an end elevation of the embodiment in FIG. 1, the position of the instrument and its lead when the instrument is in the position of readiness is represented by broken lines, and when the instrument is being used is represented by full lines.

The supporting band 4, which keeps the lead 3 extended, in its portions not in the region of the bend 7, thus preventing these portions from sagging, can be moved in its portion leading to the instrument not only in the plane of drawing of FIG. 2, but also quite extensively at an angle to this plane. The supporting band 4 can easily be distorted quite considerably in the region of the bend 7.

The type of connection between the supporting band 4 and the lead 3 can be different from the hose-like sleeve 5 shown in cross-section in FIG. 3. The band 4 can alternatively be incorporated in the actual sleeve or can form part of the sleeve.

It is possible for the lead 3 to be guided in a different manner from that shown in FIGS. 1 and 2 for the position of readiness or operational position of the instrument 1. For example, the lead 3 could first of all run upwards, approximately vertically, then bend round and downwards and pass into the position of readiness of the instrument, approximately on the same level as the housing. However it is advantageous in both the above cases for the lead 3 and its supporting band 4 to form a curve together between the point of issue from the housing 2 and the instrument 1. This bend ensures that the instrument and the lead are together able to move to and fro, whilst the lead remains almost completely extended except in the region of the bend 7.

I claim:

1. In combination, with a housing and an instrument, a lead connected at one end to said housing and at the other end to said instrument, a support for said lead, said support comprising a flexible band, which runs longitudinally alongside and parallel to the longitudinal dimension of the lead, means connecting the band to the lead along the entire length of the lead, said band being arcuately shaped in cross-section and having its concave surface facing said lead wherefore the same is characterized by a degree of longitudinal stiffness.

2. The combination according to claim 1, wherein the band is made of metal.

3. The combination according to claim 1, wherein said lead terminates at one end in a housing and follows a path defining a loop, and said supporting band extends from the housing along the lead and on beyond the said loop.

4. The combination according to claim 1, wherein a sleeve is provided for containing said lead and said band.

5. The combination according to claim 4, wherein the convex side of the supporting band faces the central point of said loop.

6. The combination according to claim 1, wherein a first part of the supporting band is rigidly connected to a housing for an instrument in such a manner that the band is unable to pivot at its juncture with the housing.

7. The combination according to claim 6 wherein the instrument is a dental instrument and the housing accommodates a drive unit for said instrument.

8. The combination according to claim 1, wherein the lead and the supporting band terminate at one end in a housing, approximately in the direction facing away from an operational point, manipulation point or position of readiness of a working instrument at which the other end of said lead and said band terminate, and can be bent round at a distance from the housing to the operational point, manipulation point or position of readiness.

9. A support according to claim 8 wherein the instrument is a dental instrument and the housing accommodates a drive unit for said instrument.

* * * * *

UNITED STATES PATENT AND TRADEMARK OFFICE

CERTIFICATE OF CORRECTION

PATENT NO. : 4,041,608

DATED : August 16, 1977

INVENTOR(S) : SVEN VILHELM EMANUEL LUNDIN

It is certified that error appears in the above-identified patent and that said Letters Patent are hereby corrected as shown below:

On Title Page, [73], Assignee:, delete "Avenska " and insert --Svenska--.

Signed and Sealed this

*Twenty-fifth* Day of *September 1979*

[SEAL]

*Attest:*

LUTRELLE F. PARKER

*Attesting Officer* — *Acting Commissioner of Patents and Trademarks*